United States Patent [19]
Keller

[11] 3,874,230
[45] Apr. 1, 1975

[54] METHOD OF AND APPARATUS FOR DETERMINING THE TENSION OF FILAMENTARY MATERIAL

[76] Inventor: Albin Keller, Blumenweg 2879, Gahwil, (St. Gallen), Switzerland

[22] Filed: Dec. 26, 1973

[21] Appl. No.: 428,611

[52] U.S. Cl................................ 73/143, 73/160
[51] Int. Cl. .............................................. G01l 5/04
[58] Field of Search.......... 73/95.5, 143, 136 R, 160

[56] References Cited
UNITED STATES PATENTS

| | | | |
|---|---|---|---|
| 1,456,596 | 5/1923 | Hugentobler | 73/143 X |
| 2,745,281 | 5/1956 | Vincent et al. | 73/143 |
| 2,978,901 | 4/1961 | Sunberg | 73/136 R |
| 3,288,382 | 11/1966 | Dunn | 73/136 R X |
| 3,354,711 | 11/1967 | Seney | 74/143 |

*Primary Examiner*—Charles A. Ruehl
*Attorney, Agent, or Firm*—Michael S. Striker

[57] ABSTRACT

The invention relates to a method and an apparatus for determining the tension of filamentary material which is to be withdrawn under adjustable tension from a package. The package is mounted rotatably and a free end portion of the filamentary material is engaged at a tension which is adjustable, so as to brake the filamentary material against withdrawal from the package. A free end of this end portion is connected to a turnable element which is mounted for pendulous displacement about a horizontal axis. The element is then turned in order to take up the filamentary material against the force of the tension acting upon it at the package. This results in an angular displacement of the turnable element from its rest position about its aforementioned axis, the extent of which angular displacement is continuously measured as an indication of the magnitude of the tension.

16 Claims, 5 Drawing Figures

METHOD OF AND APPARATUS FOR DETERMINING THE TENSION OF FILAMENTARY MATERIAL

BACKGROUND OF THE INVENTION

The present invention relates generally to a determination of the tension of filamentary material. More particularly, it relates to a method of determining the tension of filamentary material which is to be withdrawn under adjustable tension from a package, and to an apparatus for carrying out the method.

In many instances it is necessary to determine the tension of filamentary material which is to be withdrawn under adjustable tension from a package. Thus, the uniformity of tension and the precise level of the tension are usually of prime importance in determining the quality of products made from such filamentary material, be it wires, threads or the like. This is true in particularly significant measure of embroidery machines, wherein the embroidery threads are each accommodated on a bobbin in one of a large number of embroidery shuttles, which shuttles are moved in accordance with a program to embroider a certain pattern. If the tension of the threads on the bobbins in the different shuttles is different, or is not properly set for the various shuttles, the embroidered pattern will be non-uniform or even visibly poor.

The problem has, of course, been previously recognized and attempts have been made to overcome it. The previously predominant way of testing and regulating the tension was by means of drop weights, and the testing was carried out manually by letting the weights drop after they had been connected to the respective threads of the shuttles. After each dropping of the weight, the tension of the thread connected with the same was manually adjusted. However, the determination as to whether or not the adjustment was sufficient, that is whether it was not too little or too great, required a new drop of the weight, until finally a proper tension setting had been achieved. It is hardly necessary to point out that this requires substantial periods of time, especially when one considers the large number of shuttles and associated threads which had to be programmed in this manner, and the longer the time required, the less economical this approach is.

A proposed approach to overcoming this problem involved an electronic determination of the testing and regulation of the tension. However, this also was based upon dropping weights by a number of times, until as a result of the electronic determination of the tension in each instance, and of the electronic regulation, a desired tension level was obtained. Again, this was relatively time consuming and, moreover, very expensive, due to the complexity of the apparatus required for this purpose. As a result, this second prior-art approach is also not satisfactory.

SUMMARY OF THE INVENTION

It is, accordingly, an object of the present invention to overcome the disadvantages of the prior art.

More particularly, it is an object of the invention to provide an improved method of determining the tension of filamentary material which is to be withdrawn under adjustable tension from a package.

Another object of the invention is to provide an apparatus for carrying out the novel method.

In keeping with the above objects, and others which will become apparent hereafter, one feature of the invention resides in a method of determining the tension of filamentary material which is to be withdrawn under adjustable tension from a package, particularly from a bobbin of an embroidery shuttle. The novel method involves the steps of rotatably mounting the package at a first location and engaging a free end portion of the filamentary material under an adjustable tension. A free end of this end portion is connected to a turnable element which is mounted at a spaced second location for angular displacement from a rest position about an axis. The element is turned to take up the filamentary material against the force of the tension acting thereon and as a result the element becomes angularly displaced from its rest position about the aforementioned axis. The extent of such angular displacement from the rest position is continuously measured as an indication of the magnitude of the tension.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
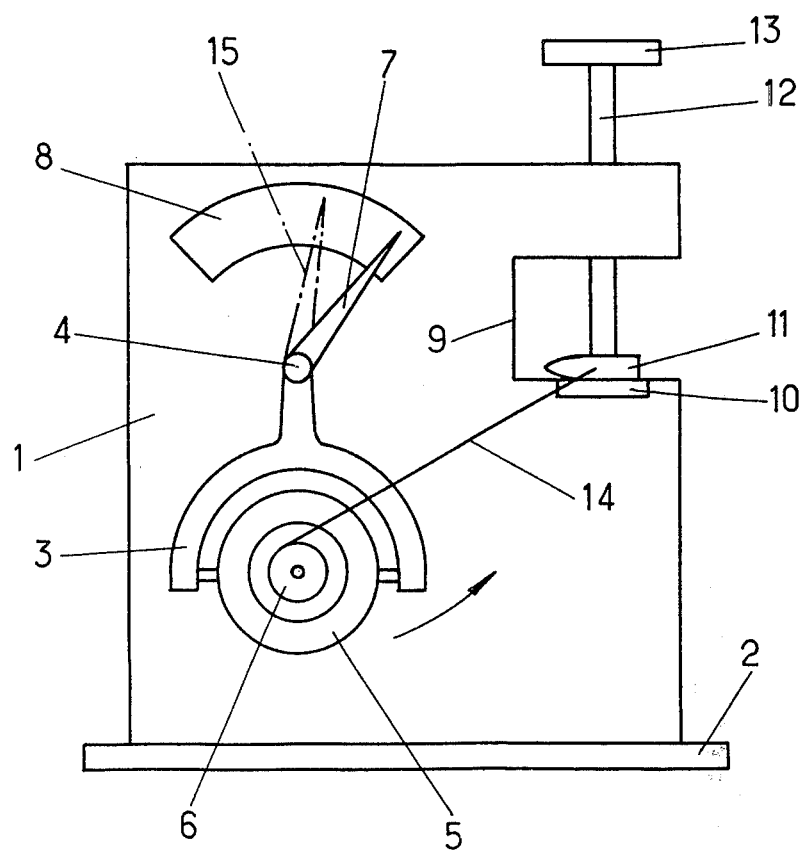
FIG. 1 is a diagrammatic side-elevational view illustrating an apparatus for carrying out the present invention.
Figure 2:
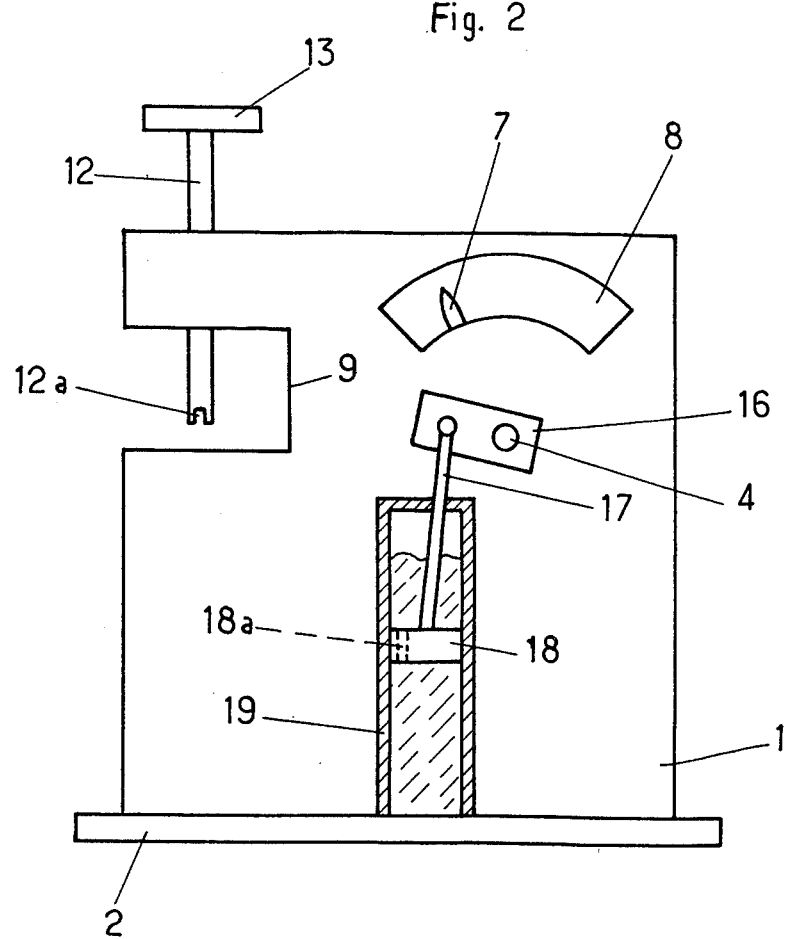
FIG. 2 is a rear view of FIG. 1.

FIGS. 1 and 2 show an apparatus according to the present invention, capable of carrying out the novel method. It utilizes a base 2 which may be plate-shaped and from which a support 1 (which may again be plate-shaped) extends upwardly. Reference numeral 4 designates a shaft which is mounted on the support 1 and defines a horizontal pivot axis. An arm, here illustrated as a bifurcated member 3, is mounted on the shaft 4 so that it can freely pivot about the same. Mounted on the arm 3 is an electromotor 5 which has mounted on it, for rotation with its output shaft, a turnable element 6, such as a bobbin-like component, onto which filamentary material can be wound. Also mounted on the shaft 4 for turning with the same, is a pointer 7. The pointer 7 may be of one piece with the arm 3 or may be fixedly connected with the same. It could, however, also simply be mounted on the shaft 4 so as to turn with the same. The particular solution depends upon whether the arm 3 simply pivots on the shaft 4 while the same is stationary, or whether the shaft 4 is itself turnably mounted and the arm 3 is fixed with it, so that the arm 3 and the pointer 7 would both be pivoted together with the shaft 4.

In any case, a scale 8 is provided, with reference to which the pointer 7 pivots. It will be assumed for purposes of explanation that the particular position illustrated for the pointer 7 is a rest position, in which the pointer 7 will normally be located when the arm 3 is not caused to perform a pendulous movement, that is an angular displacement about the axis defined by the shaft 4.

Laterally spaced from the axis 4 there is provided a cutout 9 in the support 1, and a mounting portion 10 is provided on which a package of filamentary material to be tested can be mounted. In the illustrated embodiment I have shown a shuttle 11 which in its interior accommodates a turnable bobbin, on which the filamentary material is wound (compare FIG. 2). The shuttle 11 is held in place by an advantageously flexible member 12 which is also mounted in the support 1, for instance by being threaded through an internally tapped bore, and which is provided with a handle portion 13 by means of which it can be threaded downwardly to clamp the shuttle 11 in place, and upwardly to release the shuttle.

The filament, for instance thread, the tension of which is to be tested is identified with reference numeral 14. A free end of the filament 14, which is engaged in the shuttle 11 by a conventional thread brake that can be adjusted to provide different degrees of resistance to withdrawal of the filament 14 from the bobbin (see FIG. 2), is connected with the element 6, for instance by a clamp or even by a piece of adhesive tape or the like (not shown).

To test the tension of the filament 14, the electromotor 5 (the electrical connections of which have not been shown since they are evident to those skilled in the art) is now energized. The electromotor 5 is of the type which turns very slowly and in the illustrated embodiment rotates in counterclockwise direction. As this takes place, it attempts to withdraw filament 14 against the braking action of the thread brake in the shuttle 11. The greater the braking action is which opposes this withdrawal, and thus the greater the tension acting upon the filament 14, the more the resistance which this tension opposes to the taking-up action of the turnable element 6. Consequently the entire assembly, composed of the components 3, 5 and 6, becomes pivoted towards the right in the direction of the arrow, that is it becomes angularly displaced about the pivot axis defined by the shaft 4. Since the pointer 7 moves in correspondence with this pivoting, namely towards the left in FIG. 1, it passes along the indications provided on the scale (the indications have been omitted as not essential for an understanding of the invention). When the pointer 7 moves past the indication which shows that the desired tension has been reached, the thread brake in the shuttle 11 can be gradually released until the pointer 7 indicates that the tension of the filamentary material 14 has reached the desired degree. If the tension is too low, that is if the pointer 7 does not move far enough out of its rest position, then the thread brake can, conversely, be gradually tightened until the pointer 7 moves to the indication on scale 11 which shows that the desired tension has been reached. In either case, of course, the motor 5 will remain energized during this adjustment of the thread brake.

If desired, a further pointer 15 can be provided which is fixed, insofar as the pivoting of the arm 3 is concerned. In other words, the pointer 15 which is shown in chain lines is to mounted that it can be adjusted to point to different parts of the scale 8, but it will not pivot with the pointer 7 about the axis defined by the shaft 4. The pointer 15 can then be set to that indication on the scale 8 which is representative of the desired tension of the filamentary material 14. It is then merely necessary for the operator to watch until the pointer 7 overlies the pointer 15, which will be an indication that the desired tension has been reached. This facilitates reading-off of the desired result. The pointer 7 may for instance be located at the front side of the support 1, and the pointer 15 at the reverse side, which is why the pointer 15 has been shown in chain lines. Naturally, another arrangement could be employed.

By resorting to the present invention, the tension of the filamentary material 14 can be continually varied until the desired degree of tension has been achieved. Depending upon the type of package carrier, such as the shuttle 11, the yieldable element 12 may be provided at its lower end with a portion (for instance shaped like the bit of a screwdriver) which so engages the thread brake that the latter can be tightened or released merely by turning the handle portion 13.

The oscillations of arm 3 may be dampened hydraulically, as shown in FIG. 2, so as to compensate for irregularities in the filamentary material 14 and to avoid or reduce undesired fluctuations in the indications provided by pointer 7.

For this purpose the shaft 4 carries an arm 16 to a free end portion of which there is articulated a piston rod 17 of a piston 18 which is slidable in an oil-filled cylinder 19. Piston 18 is formed with a bore 18a through which oil can flow from the space below the piston to the space above it, and vice versa. Movement of arm 3 causes sliding of piston 18 in cylinder 19, and such sliding movement is dampened by the fact that the oil can yield to the piston 18 only by flowing through the bore 18a. When the arm 3 has reached a position indicative of the tension of thread 14, it will remain in this position —rather than to oscillate— as a result of the thus provided hydraulic braking action.

Figure 3:
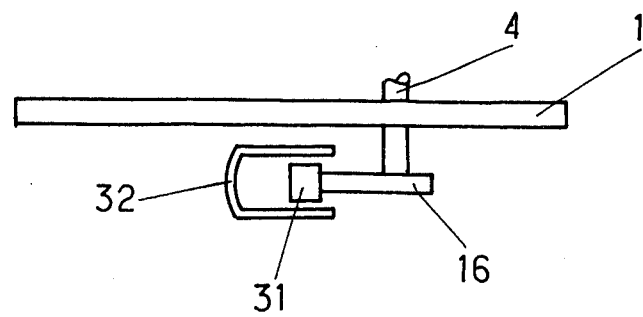
FIG. 3 is a fragmentary top plan view of FIG. 2, but showing a modified embodiment.

In lieu of the arrangement of FIG. 2, a magnetic braking arrangement could be used, for instance of the type shown in FIG. 3. Here, the free end portion of the arm 16 carries a magnet 31 which can swing with the arm 16 between the arms of a substantially U-shaped member 32 of magnetically permeable material, e.g. iron. This will offer the desired braking action for the arm 3.

Figure 4:
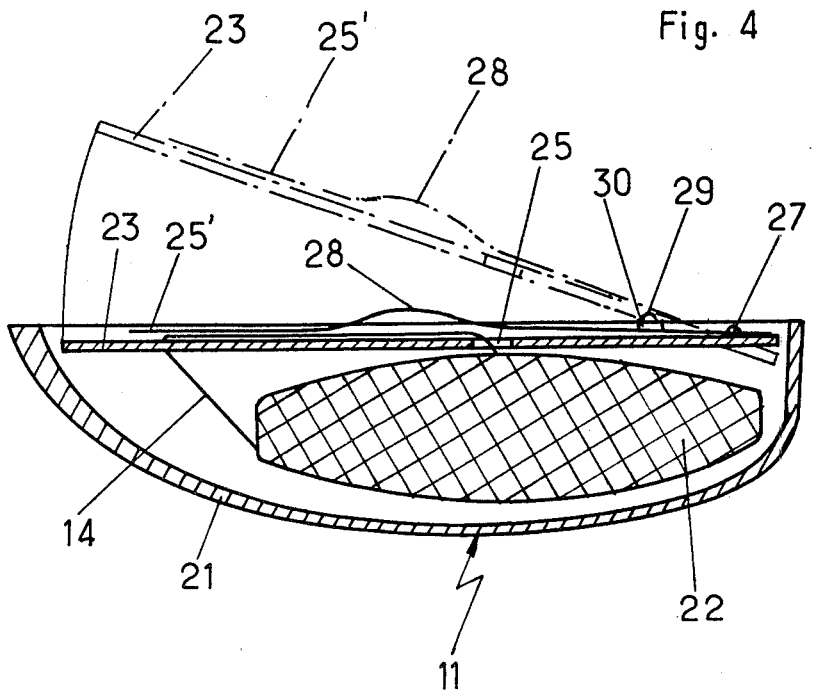
FIG. 4 is a sectioned side view of a detail of the apparatus.
Figure 5:
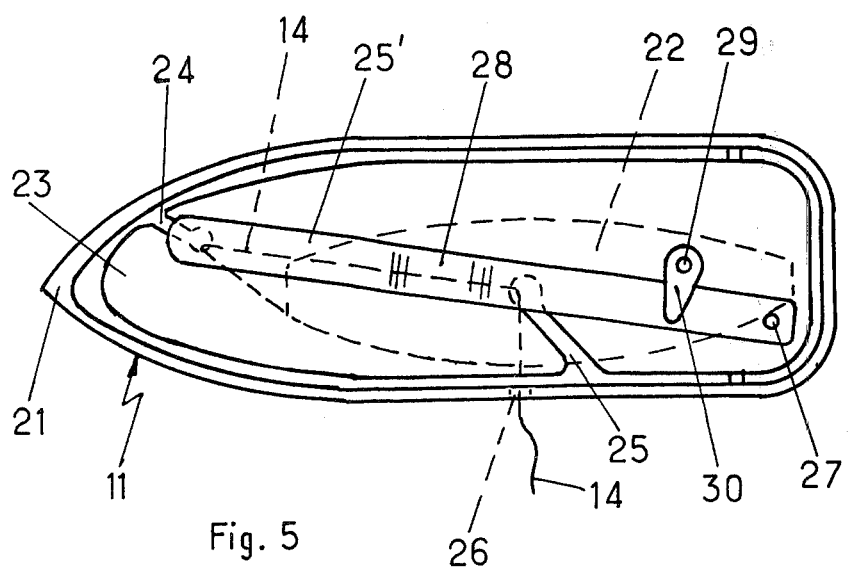
FIG. 5 is a top plan view of FIG. 4.

The operation of the thread brake —mentioned earlier— will be explained with reference to FIGS. 4 and 5. It will be seen that the shuttle 11 has a housing 21 which accommodates a thread bobbin 22; a cover 23 holds the bobbin in place. The thread 14 is withdrawn from the bobbin 22 and made to pass through two slots 24 and 25 across the cover 23, in such a manner that the thread 14 passes beneath a braking spring 25' and then exits through an opening 26.

Spring 25' is fixed to the cover 23 at 27; it is a leaf-spring which has a bend 28. A lug 30 is turnable about a pivot 29 and presses upon the spring 25' at a side where the thread 14 passes beneath the spring. The closer the lug 30 moves to the bend 28 by being pivoted about the pivot 29, the stronger will be the pressure exerted upon thread 14 by the spring 25' and, hence, the more pronounced the braking effect on thread 14. The reverse is true as the lug 30 is pivoted away from bend 28.

The bifurcated lower end 12a of the member 12 (see FIG. 2) embraces the lug 30 (the engagement could evidently also be different). Therefore, turning of the member 12 via the handle portion 13 causes the lug 30 to be turned about its pivot 29, so that the braking action can be increased or decreased, as desired. Shuttles of this type, and their associated thread brakes, are commercially available, inter alia from the Arthur Schmid Co. of Romanshorn (Thurgau), Switzerland, and from Hans Buehler A.G. of Arbon (Thurgau), Switzerland.

It will be understood that each of the elements described above, or two or more together, may also find a useful application in other types of constructions differing from the type described above.

While the invention has been illustrated and described as embodied in an apparatus for determining the tension of filamentary material which is to be withdrawn under adjustable tension from a package, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of determining the tension of filamentary material which is to be withdrawn under adjustable tension from a package, particularly from a bobbin of an embroidery shuttle, comprising the steps of rotatably mounting the package at a first location and engaging a free end portion of the filamentary material under an adjustable tension; connecting a free end of said end portion to a turnable element which is mounted at a spaced second location for turning movement about a first axis and for angular displacement with said first axis from a rest position about a second pivot axis; turning said element about said first axis to take up the filamentary material against the force of the tension acting thereon, with resultant angular displacement of said element and first axis from said rest position about said second pivot axis; and continuously measuring the extent of such angular displacement from said rest position as an indication of the magnitude of said tension.

2. A method as defined in claim 1; and further comprising continuously varying said tension during the step of turning.

3. A method as defined in claim 1, wherein said element is mounted for pendulous displacement about said second axis and tends to oscillate; and further comprising the step of hydraulically damping the oscillations of said element.

4. A method as defined in claim 1, wherein said element is mounted for pendulous displacement about said second axis and tends to oscillate; and further comprising the step of magnetically damping the oscillations of said element.

5. An apparatus for determining the tension of filamentary material which is to be withdrawn under adjustable tension from a package, particularly from a bobbin of an embroidery shuttle, comprising first means for rotatably mounting a package of filamentary material which is held under adjustable tension against withdrawal from the package; second means engageable with a free end portion of said filamentary material of said package and being turnable about a first axis so that said filamentary material becomes wound onto said second means in response to said turning; third means mounting said second means and said first axis for pivotable angular displacement from a rest position about a second axis in response to turning of said second means about said first axis and against the force of the tension acting on said filamentary material; and fourth means for continuously measuring the extent of such angular displacement from said rest position as an indication of the magnitude of said tension.

6. An apparatus as defined in claim 5, wherein said third means mounts said second means for pendulous displacement about said second axis.

7. An apparatus as defined in claim 6, wherein said second means comprises an electromotor and an element mounted on and turnable by the same about said first axis; said third means comprising an arm having an upper portion mounted for said pendulous displacement about said second axis, and a lower portion on which said electromotor is mounted.

8. An apparatus as defined in claim 7, said fourth means comprising a pointer provided on said upper portion for displacement with said arm; and a stationary scale mounted adjacent said pointer so that the latter moves with reference to said scale when said arm is displaced.

9. An apparatus as defined in claim 8; and further comprising an indicator movable independently of said pointer relative to said scale, and settable to a plurality of indicating positions.

10. An apparatus as defined in claim 7, wherein said first means comprises a package-holding portion laterally spaced from said axes.

11. An apparatus as defined in claim 10; and further comprising retaining means on said first means for retaining the package on said holding portion.

12. An apparatus as defined in claim 7; and further comprising damping means for damping the oscillations of said arm during the pendulous movement of the latter.

13. An apparatus as defined in claim 12, wherein said damping means comprises a magnetic brake.

14. An apparatus as defined in claim 12, wherein said damping means comprises a hydraulic cylinder-and-piston unit.

15. An apparatus as defined in claim 5, wherein the package includes a filament braking device for braking the withdrawal of the filament from the package and thereby adjusting said tension; and further comprising adjusting means for adjusting said braking device during operation of said second means.

16. An apparatus as defined in claim 15, said adjusting means comprising a rotatable member which is engageable with said braking device for adjusting the same, and a handle portion for rotating said rotatable member.

* * * * *